May 12, 1959     H. C. STEARNS     2,886,019
METHOD AND APPARATUS FOR IMPROVING THE EFFICIENCY
OF INTERNAL COMBUSTION ENGINES

Filed March 27, 1957     4 Sheets-Sheet 1

INVENTOR.
Harry C. Stearns
BY
Quarles & French
Attys.

May 12, 1959
H. C. STEARNS
2,886,019
METHOD AND APPARATUS FOR IMPROVING THE EFFICIENCY
OF INTERNAL COMBUSTION ENGINES
Filed March 27, 1957
4 Sheets-Sheet 2
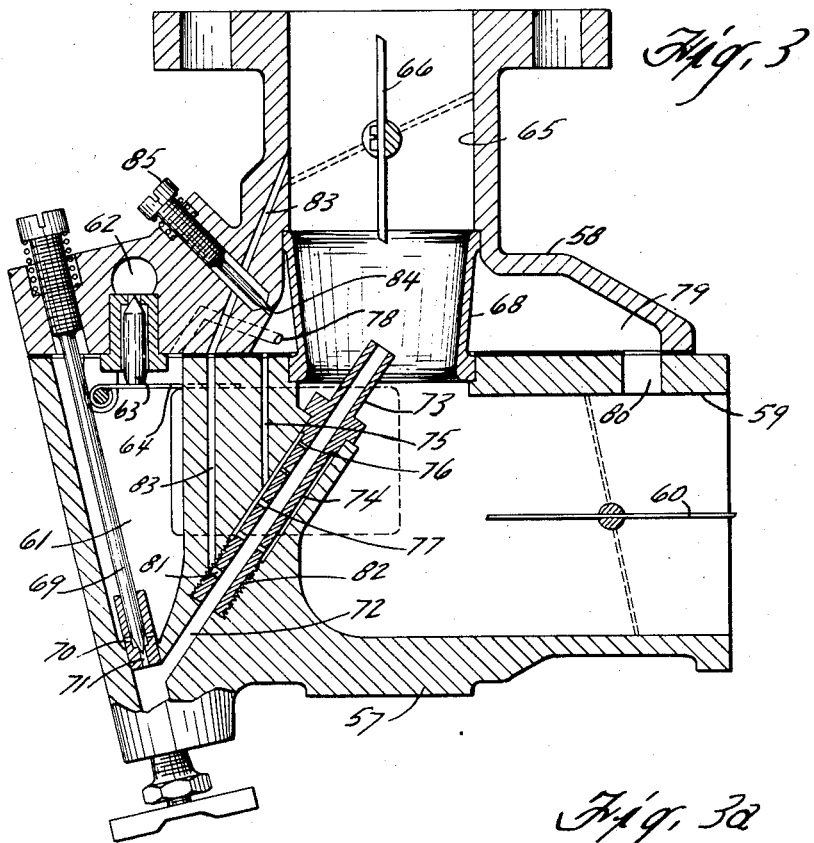
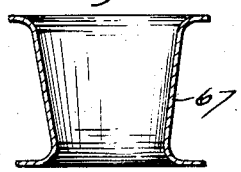
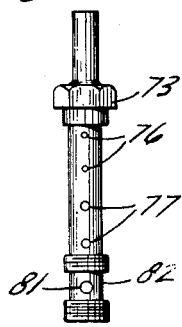
INVENTOR.
Harry C. Stearns
BY
Charles French
Att'ys

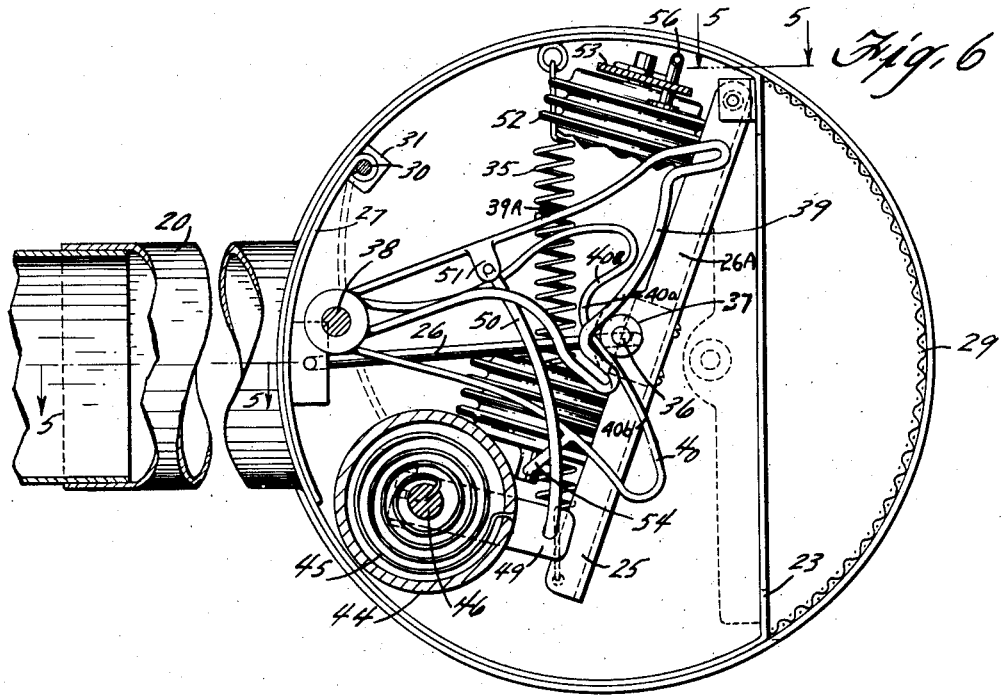

May 12, 1959     H. C. STEARNS     2,886,019
METHOD AND APPARATUS FOR IMPROVING THE EFFICIENCY
OF INTERNAL COMBUSTION ENGINES
Filed March 27, 1957     4 Sheets-Sheet 4
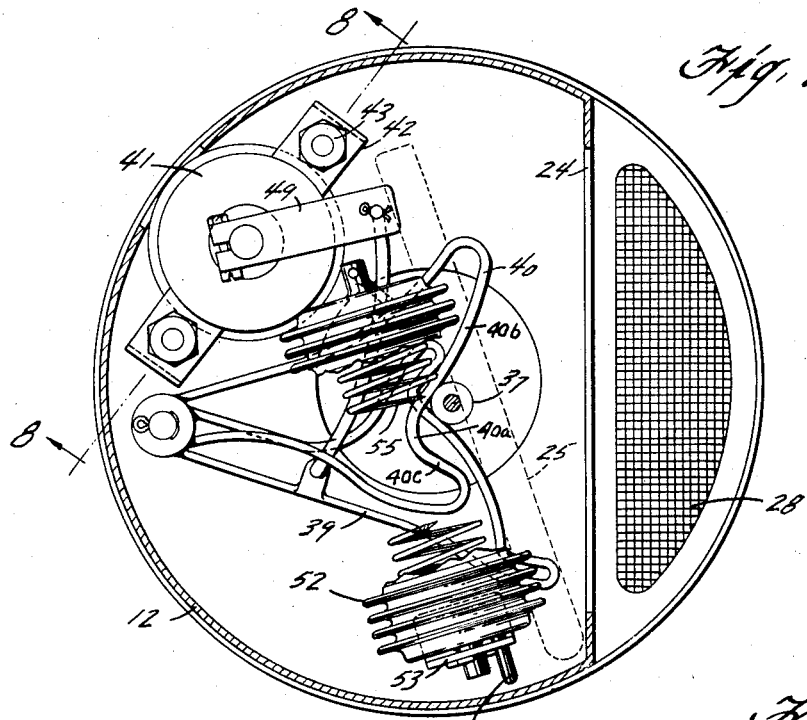
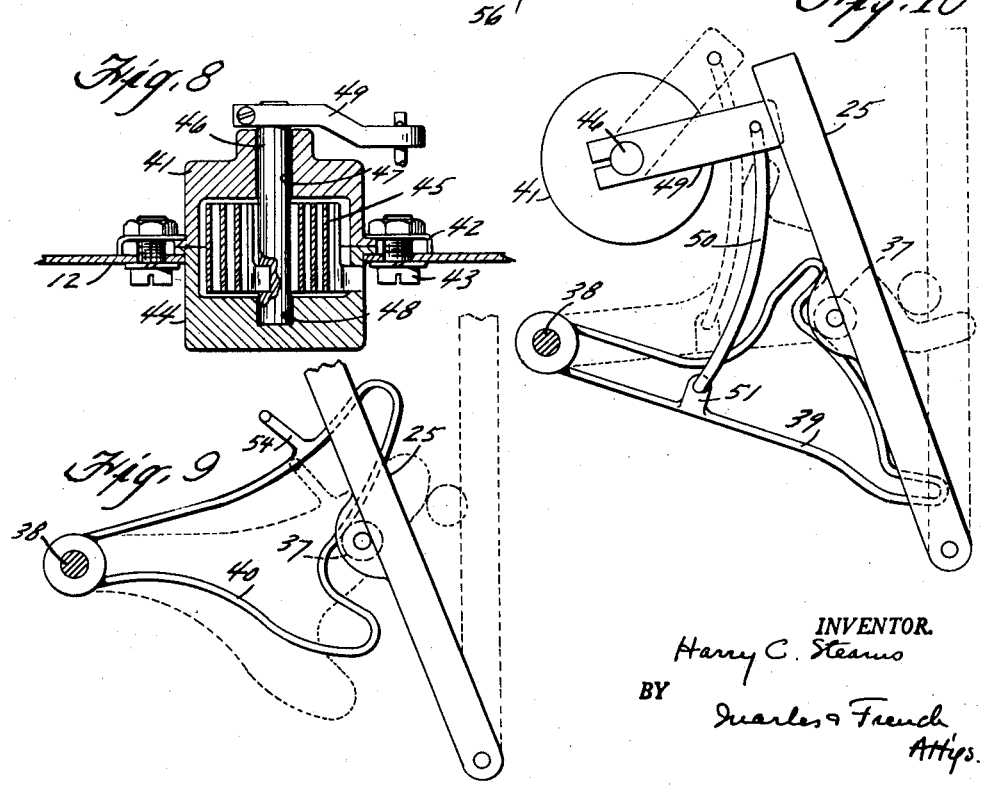
INVENTOR.
Harry C. Stearns
BY Quarles & French
Att'ys.

United States Patent Office 2,886,019
Patented May 12, 1959

2,886,019

METHOD AND APPARATUS FOR IMPROVING THE EFFICIENCY OF INTERNAL COMBUSTION ENGINES

Harry C. Stearns, Glen Ellyn, Ill.

Application March 27, 1957, Serial No. 648,873

12 Claims. (Cl. 123—122)

The invention relates to a method and apparatus for improving the performance characteristics and/or efficiency of internal combustion engines using carburetted fuel mixtures.

One of the objects of the invention is to provide a method and apparatus for improving the volumetric efficiencies under all open throttle conditions of internal combustion engines of the throttling type.

Another object of the invention is to provide a method and apparatus to improve the fuel economy of throttling type internal combustion engines at both wide open and partially open throttle conditions.

Another object of the invention is to provide a temperature control apparatus for an engine to maintain uniform operating conditions not affected by changes in temperature of the ambient air supply for said engine.

Another object of the invention is to lessen engine cylinder wear by providing essentially dry carburetion so as to reduce crankcase dilution.

Another object of this invention is to prevent carburetor icing.

Another object of the invention is to provide apparatus permitting a more rapid warm-up of internal combustion engines and provide controls for the combustion air which will respond rapidly to altered engine demands to provide temperatures for the air entering the carburetor best suited to said demands.

The invention further consists in the several features hereinafter set forth and more particularly defined by claims at the conclusion hereof.

In the drawings:

Fig. 3 is a vertical sectional view of the carburetor shown in Fig. 2;

Fig. 3A is a vertical sectional view of a venturi as ordinarily used in the curburetor shown in Fig. 3;

Fig. 4 is an elevation view of the fuel nozzle member of the carburetor;

Fig. 5 is a side elevation view of the air control apparatus, with parts of the housing removed and other parts shown in section along the lines 5—5 of Fig. 6;

Fig. 6 is a horizontal sectional view, looking up from the bottom of Fig. 4 and taken on the line 6—6 of Fig. 5;

Fig. 7 is a detailed horizontal sectional view of the air control apparatus taken on the broken line 7—7 of Fig. 5, one of the valves being shown in dotted lines;

Fig. 8 is a detailed vertical sectional view taken on the line 8—8 of Fig. 7;

Fig. 9 is a detailed horizontal sectional view taken on the line 9—9 of Fig. 5; and Fig. 10 is a detailed horizontal sectional view taken on the line 10—10 of Fig. 5.

Figures 1, 2:
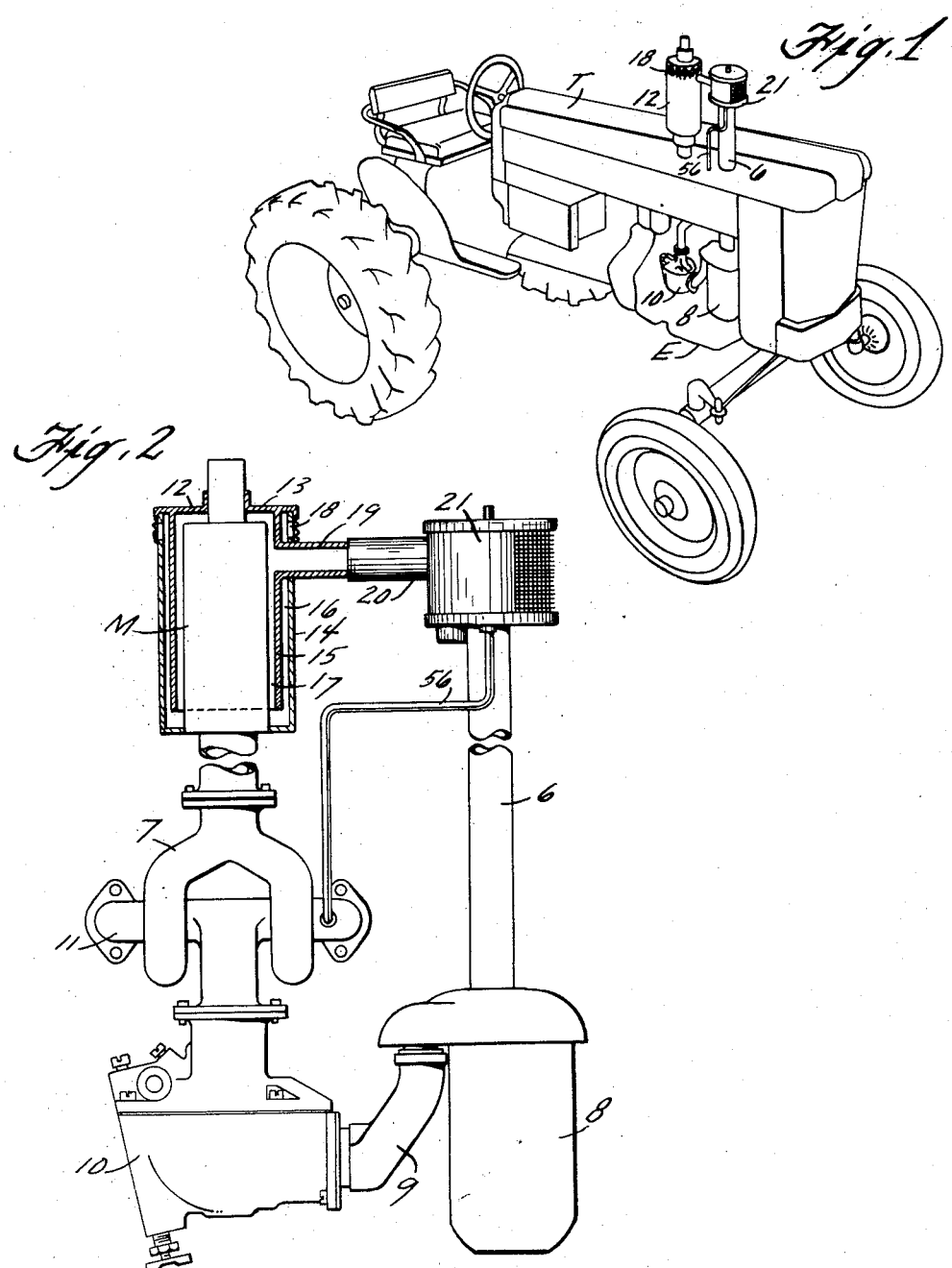
Fig. 1 is a perspective view of a tractor equipped with apparatus embodying the invention, parts being broken away.
Fig. 2 is a view partly in section of apparatus embodying the invention.

Exhaust jackets to supply heated air to carburetors are old in the art associated with thermostatically controlled means for supplying air at varying temperatures, but such arrangements have not been applied in a manner to afford practical improvement, and carburetor revisions to enable greatly improved engine performance in conjunction with properly related air temperature control means have not been disclosed. In previous art the control of air temperatures has been based entirely on some engine temperature such as that of the water jacket or exhaust manifold. Water jacket temperatures in practically all cases are held constant or nearly constant, after warm-up, by thermostats, so are not practicable since for best results the air temperatures should be variable to meet varying engine operating conditions. Exhaust manifolds being of heavy cast iron have a time delay factor in their heating and cooling characteristics which make them of little value to meet sudden changes of engine demand as in automobile, truck, and tractor performance. Hot spots in intake manifolds which are heated by the exhaust jackets of the engine to improve the vaporization of the fuel in the manifold under conditions of low velocities and/or cold temperatures have been used, but these tend to further lower volumetric efficiencies which have already been needlessly lowered by carburetor restrictions to the point where when maximum power is demanded under high ambient temperature conditions, such power is not available. These hot spots also deliver most heat at a time when it is least needed and do not develop enough heat at times when it is most useful.

The disadvantages of the structures, above pointed out, have been overcome in the present invention by providing a receptacle of light weight metal in which exhaust heated air and cold air are mixed before passing to the carburetor so that almost instantaneous changes of air temperature can be obtained and high or low temperatures of air used to meet varying engine conditions.

The desirable performance characteristics of throttled internal combustion engines to secure the results desired by this invention should be considered as in two categories, which are, the wide open throttle demands and second the desirable partially open throttle characteristics. When the throttle is opened wide, a demand for maximum power of the engine is evident. This can be accomplished neither with unduly high temperature air entering the carburetor nor with extremely low temperature air since the high temperature lowers the volumetric efficiencies of the engine and the extremely low temperatures undesirably lower the vaporization of the fuel, thus requiring carburetor arrangements enabling high atomization of the fuel, to afford reasonably uniform distribution of the same to the cylinders. These undesirable carburetor arrangements comprise venturis so small in throat dimensions that they limit the volumetric efficiencies appreciably at higher air temperatures, and require air-bleeds too large to control mixture proportions well through extreme temperature changes. From this it follows that the above referred to undesirable carburetor arrangements needed to meet cold air demands are unsuitable under higher temperature conditions where maximum power is demanded under any condition.

By undesirable carburetor arrangements comprising venturis of small throat dimensions, I mean those which have heretofore been used in practice to use air at high velocity through the throat of the carburetor to atomize the fuel. In one well-known carburetor the maximum air velocity through the venturi throat approximates 400 feet per second on the basis of 90% volumetric efficiency. One feature of my method of improving the efficiency of an internal combustion engine is to materially increase the area of the venturi throat so that the maximum air velocities therethrough are materially reduced to a range of 150 to 250 feet per second, preferably 200 feet per second, resulting in an increase of 5% in volumetric efficiencies or 95% volumetric efficiency, the reduction in air speed past the jet being made possible according to my method by maintaining the temperature of the air entering the carburetor constant and within a range of 40° to 110° F., preferably 110° F. so that the heat of the air will better vaporize the fuel.

When the throttle is only partially opened, the fact that maximum power is not being called for enables a leaning out of the mixture provided by the carburetor to the minimum at which the engine will run well. The calls for dry carburetion and dry mixture in the manifold which can best be accomplished by, at all times, materially elevating the temperature of the air above the ambient as it enters the carburetor. As the throttle is closed down, the velocity past the main jet drops off to nearly zero and as the throttle approaches the idling position, the fuel is supplied from the idling jet near the edge of the closed throttle, because the velocity of the main jet has become so low that to get even a fair degree of atomization requires a transfer of fuel feed point to one at which higher velocity occurs. There is a range between these two extremes in which truck, automobile, and tractor demands are nearly always used in which the atomization is poor and it is through this range that higher temperature air can be made to materially improve cylinder distribution economy and smooth performance.

Contrary to the usual practice, according to my method of securing increased fuel economy at partially open throttle engine conditions, the air entering the carburetor is heated to a high temperature, that is, to a range of from 200° to 500° F., so that even though at part throttle conditions the velocity of the air stream is so low as to prevent proper atomization of the fuel, the high heat of the air according to my method will adequately vaporize the fuel at the lower air velocities employed to secure efficient operation with an improved fuel economy. In this connection it is to be noted that the use of highly heated air also acts to increase the compression pressure of the mixture under throttling conditions, which under this condition is undesirably low, and thus adds to the efficiency of the engine operation under these conditions. By the carrying out of the steps of the method as above described, I have been able in one instance to obtain the full rated horse power of a tractor which in the past year set the world's record for fuel economy where, during the test, when ambient temperatures increased from 40° F. to 110° F., the tractor with previous world's record economy equipment suffered a drop of from maximum 55 to 50 horse power, and I also have been able to develop the full rated horse power at all times regardless of the ambients at which the tractor was subjected and this with fuel economies which widen the margin by several times between this tractor and its nearest competitor. Partially opened throttling economies were also attained to a greater degree than formerly and with very smooth performance. The herein disclosed equipment also prevented carburetor icing which under cold operating conditions had been very objectionable and provided ability to put the tractor under full load in but a small fraction of the time normally demanded as well as to prevent performance failure evident under cold operating conditions when standard equipment had been used.

In Fig. 1, I have shown a tractor T having an internal combustion engine E provided with an exhaust pipe 5 and an intake 6. In Fig. 2 the exhaust pipe 5 is shown as connecting with an exhaust manifold 7 for the engine and the intake pipe 6 connecting with an air cleaner 8 whose outlet is connected by a pipe 9 with the inlet to a carburetor 10 that is connected to the engine inlet manifold 11.

The exhaust pipe 5 is provided with the usual muffler M which, as is well known, is formed of fabricated sheet metal parts of thin walled section so that heat is rapidly dissipated therefrom. Over this muffler and the upper end of the exhaust pipe, I mount a tubular housing 12 suitably clamped at its top 13 to the exhaust pipe and having depending concentrically disposed tubular side walls 14 and 15 to provide annular air channels 16 and 17. The wall 14 has a series of screen covered air inlet openings 18 at its upper portion and its bottom is flanged inwardly as shown in Fig. 2 to engage the muffler. The wall 15 has an outlet pipe connection 19 extending through a portion of the wall 14 and connected with an intake pipe fitting 20 of an air control housing 21 of thin sheet metal having a flanged bottom opening 22 adapted to receive the upper end of the intake pipe 6.

With the above construction air drawn into the housing 12 by engine suction through the openings 18 passes down the channel 16 and around the lower end of the tube 14 and thence upwardly through the channel 17 to receive heat from the muffler and thence through the pipes 19 and 20 into the housing, the air space and channel 16 acting as a heat insulator for the wall 15 to permit a more efficient and rapid heating of the air passing through the channel 17.

The housing 21 is cylindrical and provides a chordally disposed partition 23 having an ambient air inlet opening 24 controlled by a pivoted flap valve 25 which is operatively connected by a link 26 to a pivoted curved flap valve 27 controlling the passage of exhaust heated air into the housing through the opening 20a formed by the pipe 20. The opening 24 is preferably of considerably larger area than the opening 20a. A portion of the bottom of the housing is cut away to provide a screened opening 28 and the side wall of the housing facing the partition is cut away and covered by a screen 29.

The curved valve 27 is carried by a pin 30 suitably pivotally mounted in bearings in the housing, one of which 31 is indicated in Fig. 6, and the valve 25 is a flat plate having flanged top and bottom edges 26A and is pivotally mounted on a pivot pin 32 passing through these edges and a spacer sleeve 33 and secured to angled brackets 34 secured to one end of the partition 23.

The valve 25 is normally urged to an open position by a spring 35 connected to its outer end and to the housing. A journal pin 36 is secured to and intermediate the ends of the bottom edge 26A and carries a cam engageable roller 37.

A post 38 extends upwardly from the bottom of the housing 12 upon which the hub portions of cams 39 and 40 are pivotally mounted, said cams adapted to engage the roller 37 and through it control the position of the valve 25 relative to the opening 24 and, consequently, through the link 26 the position of the valve 27 relative to the opening 20a, the spring 35 acting to hold said roller in operative engagement with either of said cams.

Referring to Figs. 5 to 10, the position of the cam 39 relative to roller 37 is under the control of a thermostatic means including a fixed housing section 41 secured by clips 42 and screw bolts 43 to the bottom of the housing, an adjustable housing section 44 having its upper end mounted in the bottom of the housing for rotation relative to the fixed housing and extending to an exposed position beneath said housing, and a bimetallic thermostatic element or coil 45 secured at its outer end to a wall of housing section 44 and secured at its inner end to post 46 vertically, pivotally mounted in bores 47 and 48 in said housing sections. The exteriorly disposed end of post 46 has a crank arm or lever 49 secured thereto and is operatively connected at its outer end by a link 50 with a pivot boss 51 forming part of the cam 39.

While the thermostat could be mounted wholly within the housing, the mounting above described in which a portion of it is exposed to temperatures within the housing 12 and a portion exposed to ambient air temperature is preferred as it provides very good controllability with changes of ambient air temperature and permits ready adjustment of the coil from the exterior of the housing by the rotation of the lower section 44 relative to the post 46 when the bolts are loosened. The expansion and contraction of the coil 45 under the action of temperature of the air entering the housing 12 acts through the crank or lever 49 and the link 50 to alter the position of cam 39 to regulate the positions of valves 25 and 27 relative to their port openings to maintain the air temperatures desired under wide open throttle conditions or those within 80% of open throttle conditions.

Referring to Figs. 5 to 9, the position of the cam 40 relative to the roller 37 is under the control of means sensitive to changes in manifold vacuum including a multiple bellows diaphragm 52 mounted at one end on a bracket arm 53 fixed to the housing and pivotally connected at its outer free end to an arm 54 projecting downwardly from a portion of said cam 40. The bellows 52 is normally held in its desired extended position by a spring 55 mounted in the interior thereof between its fixed and movable ends. A tube 56 connected with the intake manifold 11 as indicated in Fig. 2 connects at its other end with the interior of the bellows at its fixed end portion as shown in Fig. 6, so that the bellows under the action of manifold vacuum induced by throttle closure will contract against the action of its spring 55 and thus move the cam 40 in a manner to force the air valve 25 closed and open hot air valve 27 to materially elevate the intake air temperatures above those which would be afforded by the thermostatic control to deliver extremely hot air (200° to 500° F.) to the carburetor under partially open throttle conditions below that of 80% of full throttle.

While improved results may be obtained using the air control with any suitable known forms of carburetors, better results may be obtained where the venturi of the carburetor is enlarged as previously noted and in this connection I have shown, in Fig. 3, one well known make of carburetor modified as hereinafter described.

Referring to Fig. 3, the carburetor shown includes a two-part housing 57, 58 and including air inlet passage 59 having the usual rotary choke valve 60 mounted therein, a fuel reservoir 61 receiving fuel from a supply passage 62 past a valve 63 controlled by the float operated lever 64 and an inlet passage 65 having the usual butterfly throttle valve 66 pivotally mounted therein. Passages 59 and 65 are usually connected by the venturi throat member 67 shown in Fig. 3A but in place of this venturi member I mount between the sections a venturi member 68 having much greater cross sectional area whereby the maximum air velocities provided by member 67 of approximately 400 feet a second are reduced by member 68 to approximately 200 feet a second.

The carburetor shown includes the usual manually adjustable valve 69 controlling passage of fuel from the reservoir 61 through openings 70 and 71 to a jet supply passage 72 that has the jet nozzle member or tube 73 mounted in housing 57 to form a continuation of passage 73 and an annular space 74 that connects with an airbleed passage 75. Member 73 has the usual air-bleed holes 76 and 77 formed therein, but the holes 76 are in this instance larger than those customarily used and permit excellent atomization of those ingredients of the fuel that are less volatile. By employing carburetor air temperatures, under all wide open throttle conditions, close to the maximum ambient air temperature under which the engine will ever operate, large venturis and large air-bleeds are safely used, which would be impossible or inadmissible under conditions where extremely cold air could be encountered without controlled heat. It is advantageous to use large air-bleeds when air temperatures entering the carburetor are kept near constant and fuel is closely metered, but would be hazardous when wide ranges of air temperatures are permitted for reasons given in my prior United States Patent No. 2,715,420. When large air-bleeds are used, the fuel control means as disclosed in my prior United States Patent No. 2,715,420 and United States Patent No. 2,621,909 may also be used to advantage. The maintaining of certain relatively constant temperature ranges, as compared with wide ambient variations, also makes possible changed proportional sizes of holes between accelerating wells, when used, and the main jet tubes to better control mixture proportions through the partially open throttle range, and then to afford any desirable maximum air-bleed and well discharge under the control of the master-bleed. In other words, it is not necessary in the carburetor to cater to a wide variation of conditions brought about by wide changes of temperature, when the temperatures are controlled, by the means here disclosed.

Pressure on the fuel in the reservoir 61 is equalized with that of the passage 59 by a passage 78 connected with a chamber 79 surrounding the venturi 68 which in turn connects with passage 59 by a port 80. The jet supply passage 72 connects by a passage 81 in tube 73 with an annular space 82 formed between the threaded portions of the said tube which in turn connects with an idling jet passage 83 formed in both housings and discharging in known manner into the passage 65 above the valve 66 in its closed position. An air-bleed passage 84 controlled by the usual manually adjustable needle 85 connects through the well 86 with the passage 83.

With the above construction, under the maximum suction action of the engine when the position of the throttle valve 66 of the carburetor is wide open or approximately so (within 20° of wide open) and when the ambient air temperatures are near the maximum to which the engine would ever be subjected in use (that is within the range of 40° to 110° F.) the valve 27 will be in the closed position shown in Figs. 5 and 6 and valve 25 will be wide open under the influence of spring 35 holding the roller 37 against the cams 39 and 40. Under the suction action of the engine, when throttle valve 66 is only partially opened, as when calling for less than maximum force output of the engine, valve 27 will be wide open and valve 25 will be completely closed against partition 23. This is accomplished by the movement of the cam 40 by the contraction of the bellows 52 against the action of the spring 55 under the higher manifold vacuum created by the partially opened throttle and transmitted by the tube 56 from manifold 11 to bellows 52. During the period of operation the air from the exhaust heated heater 12, 13, and 14 at full heat ranging from 200° to 500° is drawn through housing 21, pipes 6, 9 and carburetor 10.

In order to minimize changes of temperature of air entering housing 21 through inlet opening 24 under wide open or nearly wide open throttle conditions as caused by reduction of ambient air temperatures below the maximum to be encountered, the coil 45, sensitive to the air temperatures in the housing 21, acts to rotate the shaft 46 with changes of these air temperatures to move the arm 49 and link 50 to alter the position of the cam 39 and hence through the roller 37 the position of the valve 25 relative to the opening 24 as determined by the shape of the cam 39 which is designed to maintain the temperatures of the air in the housing substantially constant within the range of 40° to 110° Fahrenheit. During this operation under lessened opening of valve 25 at wide or approximately wide open throttle, the port 20a controlled by valve 27 is partially open to admit some exhaust heated air into housing 21 to mix with the air at ambient temperature entering through the port or opening 24 to maintain the normal supply of air to the carburetor for this operating condition, generally at a temperature approximating that of the maximum ambient (110° Fahrenheit) to which the engine would ever be subjected, but which may be altered by the adjustment of the thermostatic coil 45 when special circumstances may make this advantageous. Since housing 44 extends outside the housing 21, the coil 45 is as previously noted affected by both changes of air temperature within and without the housing so that a differential bias is provided to desirably alter the action of the thermostat to position the cam 39. Thus depending upon the position of the thermostat, the position of the cam 39 may be controlled and therefore the position of the valves 25 and 27 controlled to maintain the temperature of the air passing from the housing to the carburetor substantially constant under open throttle conditions within a range of 40° to 110°, preferably 110°, regardless of the ambient temperature.

In some applications, it is desirable to elevate the air temperatures to a higher degree under very light loads (as at nearly closed throttle), than would be employed at somewhat heavier loads (as at half open throttle). By the application of a compression spring of the proper spring rate, and an exhaust jacketed stove of the proper heat capacity this may be accomplished. The spring of proper rate affords a partial opening of the ambient valve 25 and closing of hot air valve 27 in the range of half open throttle, while closing the valve 25 and opening the valve 27 as the throttle approaches the closed position. Any of many well known arrangements may be employed in these high temperature stoves so prevent excessive temperatures to build up under lessened air flow through the same, such as top temperature operated valves for ventilating.

Under throttling conditions, the manifold vacuum acting through the bellows 52 shifts the cam 40 to open the valve 27 and close the valve 25 so that the air temperatures within the chamber 21 are several hundred degrees above the ambient (200° to 500° F.), the tendency of the bimetal spring or coil 45 will be to cause over-travel of the cam 39, but in the arrangement shown the movement of cam 39 is limited at its extreme counter-clockwise travel, as viewed in Fig. 6, by the stop pin 39A. The cam travel in the opposite direction when starting from cold is limited by the closing of valve 25 against partition 23, the coil 45 expanding within the housing within tolerable limits without its change of characteristics. In some cases to accommodate the hot overtravel the link 50 is shortened to allow the arm 49 to rotate in a direction at substantially right angles to said link after it has accomplished its movement of the cam 39 as previously described. In this, a further radial movement of the arm 49 is tolerated without further movement of cam 39.

If the throttle valve 66 is suddenly, or slowly opened to wide open or nearly wide open position calling for considerable power, the manifold vacuum drops to a point permitting the spring 55 to extend the metal bellows 52 to permit the roller 37 to drop into the low spot 40a of cam 40 and move ambient air valve 25 to its wide open position and shutting the hot air valve 27. After this occurs, should the temperature in the air inlet chamber drop below the open throttle desired temperature, the coil 45 will quickly respond to force through arm 49 and link 50 the cam 39 into a position to close or partially close the valve 25 and through the link open valve 27 until the desired temperature balance is attained for this operating condition.

It is to be noted that the contour of the cam 40 is such that its riser portion 40b functions as a regulator of the position of the valve 25 under partially open throttle regulation. The riser 40c functions in the following manner: When operating at wide open throttle, an excessive load causes engine speeds to drop abnormally, the lower resultant manifold vacuum causes the metal bellows 52 to expand, under the influence of spring 55 and/or its own resilient characteristic to cause a partial closing of valve 25 under the influence of said riser 40c to slightly elevate air temperatures above the normal maximum at wide open throttle, this to offset the reduced velocities through the venturi 68. At the extreme position of riser 40c which might become effective at extremely low manifold vacuums (as a consequence of lowered engine speed under these conditions) due to lowered controlled operating temperatures for excessive overloads causing lowered engine speeds the resultant appreciable temperature rise improves or lessens the probability of engine stalling. In climates where excessively low ambient temperatures are never encountered, this may be of minor importance and might be eliminated from the cam design. The riser 40c acts to elevate the temperatures in the housing 21 through the control of the valves 25 and 27 when the speed of the engine drops and the manifold vacuum drops, when operating at wide open throttle. Under conditions where it is advantageous to operate at maximum air velocities, at temperatures in the range of 40° to 50° F. when the ambient temperature permits, (as in plowing and the like) it is very advantageous to use riser 40c to elevate the air temperatures approximately fifty degrees when the air velocities are materially reduced.

It will be noted from the above, that under open throttle conditions that the valves 25 and 27 under the action of the cam 39 are under the control of the thermostat and that under partially closed throttle conditions, changes in the positions of these valves are due to changes in manifold vacuum either partly or wholly controlled by the cam 40.

By the term "open throttle" I means to include either the wide open position of the throttle valve 66 or a position within twenty degrees of wide open position.

Reference is here made to my copending application, Serial No. 648,061, filed March 25, 1957, now Patent No. 2,853,065, for Temperature Control Apparatus, as to claims for any common subject matter.

I desire it to be understood that this invention is not to be limited to any particular form or arrangement of parts or in the steps of the method except in so far as such limitations are included in the claims.

What I claim as my invention is:

1. The method of improving the operating efficiency of a carburetor and air heater equipped internal combustion engine of the throttling type which consists, under open throttle conditions, in supplying air to the carburetor at a predetermined substantially constant temperature in the range of 40° to 110° F. and at a maximum speed past the main fuel jet of the carburetor in the range of 150 to 250 feet a second, and under partially open throttle conditions, in supplying air to the carburetor at temperatures above said predetermined substantially constant temperature which temperatures are inversely proportional to the power output delivered by said engine.

2. The method of improving the operating efficiency of a carburetor and air heater equipped internal combustion engine of the throttling type which consists, under open throttle conditions, in supplying air to the carburetor at a predetermined substantially constant temperature and said constant temperature being substantially the highest ambient air temperature that the engine will be subjected to in use and at a maximum speed past the main fuel jet of the carburetor in the range of 150 to 250 feet a second, and under partially open throttle conditions, in supplying air to the carburetor at temperatures up to 500 which temperatures vary inversely with the power output delivered by said engine.

3. The method of improving the operating efficiency of a carburetor and air heater equipped internal combustion engine of the throttling type which consists, under open throttle conditions, in supplying air to the carburetor at a substantially constant temperature in the range of 40° to 110° F. and at a speed past the main fuel jet of the carburetor in the range of 150 to 250 feet a second and under partially open throttle conditions in supplying air to the carburetor at temperatures within the range of 200° to 500° F.

4. In a temperature control apparatus for the intake air of an internal combustion engine, the combination of a housing connected with the air intake of the engine, an exhaust heated air heater, distinct from the engine, for supplying heated air to said housing, a valve controlling the passage of the heated air to said housing, a passage in said housing open to atmosphere, a valve controlling air flow through said atmospheric air passage, connections between said valves for opening one valve while closing the other, a thermostat sensitive to air temperature within the housing, means controlled by said thermostat for controlling the positions of said valves, and means responsive to pressure of air in the engine manifold to also control the position of said valves independently of said thermostat.

5. Temperature control apparatus according to claim 4 in which the thermostat is also sensitive to changes in ambient air temperatures.

6. Temperature control apparatus according to claim 4 in which the thermostat is adjustable for varying its action from without the housing.

7. In a temperature control apparatus for the intake air of an internal combustion engine, the combination of a housing connected with the air intake of the engine, an exhaust heated air heater, distinct from the engine for supplying heated air to said housing, a valve controlling the passage of heated air to said housing, a passage in said housing open to atmosphere, a valve controlling air flow through said atmospheric air passage, connections between said valves for opening one valve while closing the other, a pair of movable cams adapted to operatively engage one of said valves to control the position of said valves, a thermostat sensitive to air temperatures within the housing and operatively connected to one of said cams to control its position, and means responsive to pressure of air in the engine manifold and operatively connected to the other of said cams to control its position.

8. In a temperature control apparatus for the intake air of an internal combustion engine, the combination of a housing connected with the engine and having an inlet for heated air and an inlet for air at ambient temperature, a valve controlling each of said inlets, a thermostat sensitive to air temperatures in the housing, means controlled by said thermostat for controlling the positions of each of said valves, and manifold vacuum controlled means also acting to control the positions of each of said valves independently of said thermostat.

9. In an internal combustion engine, the combination of supply means for furnishing tempered air to the engine, said supply means arranged to communicate with a source of ambient air and with a source of heated air, valve means in said supply means for proportionately regulating heated air and ambient air; a thermostat operatively associated with said valve means to maintain the temperature of the tempered air at a predetermined minimum value under maximum engine power output conditions; and control means immediately responsive to power demands of said engine, said control means being arranged to operate said valve means independently of said thermostat under reduced engine power output conditions whereby the tempered air supplied to the engine may be maintained at temperatures above said minimum predetermined temperature value in inverse proportion to power output delivered by the engine.

10. In an internal combustion engine equipped with a jet type carburetor having an air flow speed past its main fuel jet in the range of 150–250 feet per second under open throttle conditions, the combination of supply means arranged to furnish air comprising variable proportions of ambient air and of heated air to said carburetor, valve means associated with said supply means for regulating the proportion of heated and ambient air, and a thermostatic control for said valve means adapted to maintain the temperature of the air supplied to said carburetor, under open throttle conditions, at a predetermined substantially constant temperature, said predetermined temperature being substantially the highest ambient air temperature that the engine will be subjected to in use.

11. In an apparatus as described in claim 10 wherein said predetermined substantially constant temperature is in the range of 40 to 110 degrees.

12. In an internal combustion engine equipped with a jet type carburetor having an air flow speed past its main fuel jet in the range of 150–250 feet per second under open throttle conditions, the combination of supply means arranged to furnish mixtures of ambient air and heated air to said carburetor, valves associated with said supply means for regulating the proportions of heated and ambient air, thermostatically operated control means for operating said valves to maintain the temperature of the air supplied to said carburetor at a predetermined minimum value in the range of 40° to 110° under open throttle conditions, and manifold vacuum operated control means independently associated with said valves for supplying air to said carburetor at temperatures above the minimum value in inverse proportion to power output delivered by said engine under partially open throttle conditions.

References Cited in the file of this patent

UNITED STATES PATENTS

| 1,448,008 | Smith | Mar. 13, 1923 |
| 1,512,527 | Edens | Oct. 21, 1924 |

OTHER REFERENCES

Bulletin No. 5, "The Carburetion of Gasoline," by D. C. Berry and C. S. Kegerreis, published 1920 by the Engineering Experiment Station of Purdue University.

"The High-Speed Internal-Combustion Engine" (Sir H. Ricardo and Glyde), published by Interscience (New York), 1923.